United States Patent [19]

Morris et al.

[11] 4,106,350
[45] Aug. 15, 1978

[54] THIN WIRE PRESSURE SENSOR

[76] Inventors: Richard T. Morris, 4820 W. 118th St., Hawthorne, Calif. 90250; Arthur H. Wildvank, 12516 Destino St., Cerritos, Calif. 90701

[21] Appl. No.: 828,317

[22] Filed: Aug. 29, 1977

[51] Int. Cl.$^2$ .............................................. G01L 21/12
[52] U.S. Cl. .................................................... 73/755
[58] Field of Search .............. 73/399, 398 AR, 398 R, 73/204, 27 R, 755; 338/318, 319, 36

[56] References Cited

U.S. PATENT DOCUMENTS

| | | | |
|---|---|---|---|
| 3,053,093 | 9/1962 | Smith | 73/399 |
| 3,079,800 | 3/1963 | Hoar | 73/399 |
| 3,159,998 | 12/1964 | Minter | 73/399 |

*Primary Examiner*—Donald O. Woodiel
*Attorney, Agent, or Firm*—Poms, Smith, Lande & Glenny

[57] ABSTRACT

Pressure sensing apparatus in which a mounting structure carrying a thin, pressure sensitive resistance wire is lodged in a gas passageway extending through an outer member. The mounting includes a relatively large end portion which extends substantially across the passageway to both shield the wire from direct impact by passing gas, and limit the flow of such gas by occluding the passageway. The secure wire mounting apparatus makes possible the use of very thin wires and a corresponding increase in pressure sensitivity resulting from temperature and gas thermal conductivity. The wire diameter is no more than about 0.00005 inch, making possible results comparable to much more expensive mass spectrometer techniques.

An overall pressure sensing system is described in which the sensor is coupled with electric circuitry to produce transient and/or absolute pressure readings over an approximately nine decade pressure range. Transient readings of gas temperature and thermal conductivity may also be made.

22 Claims, 10 Drawing Figures

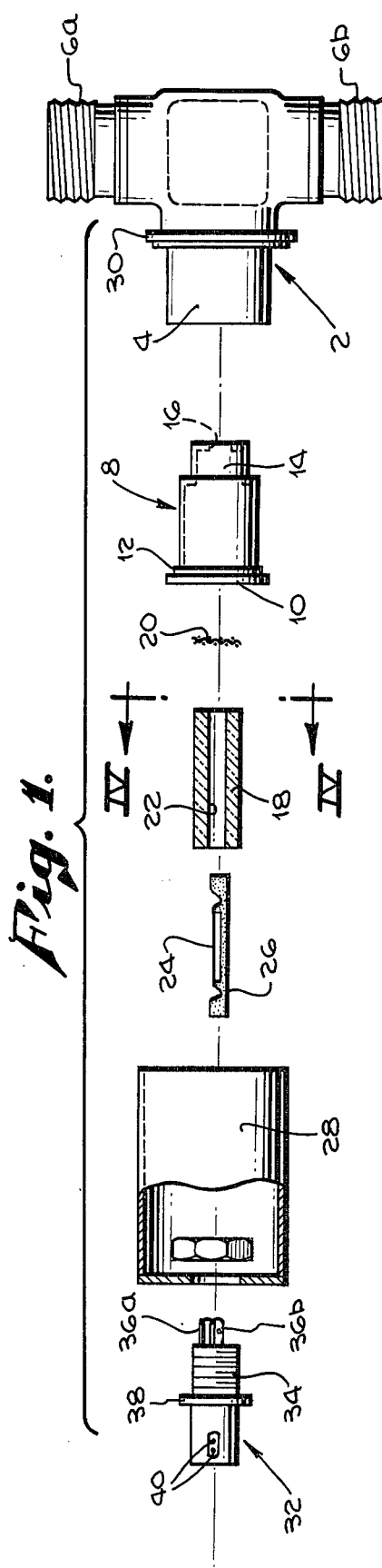
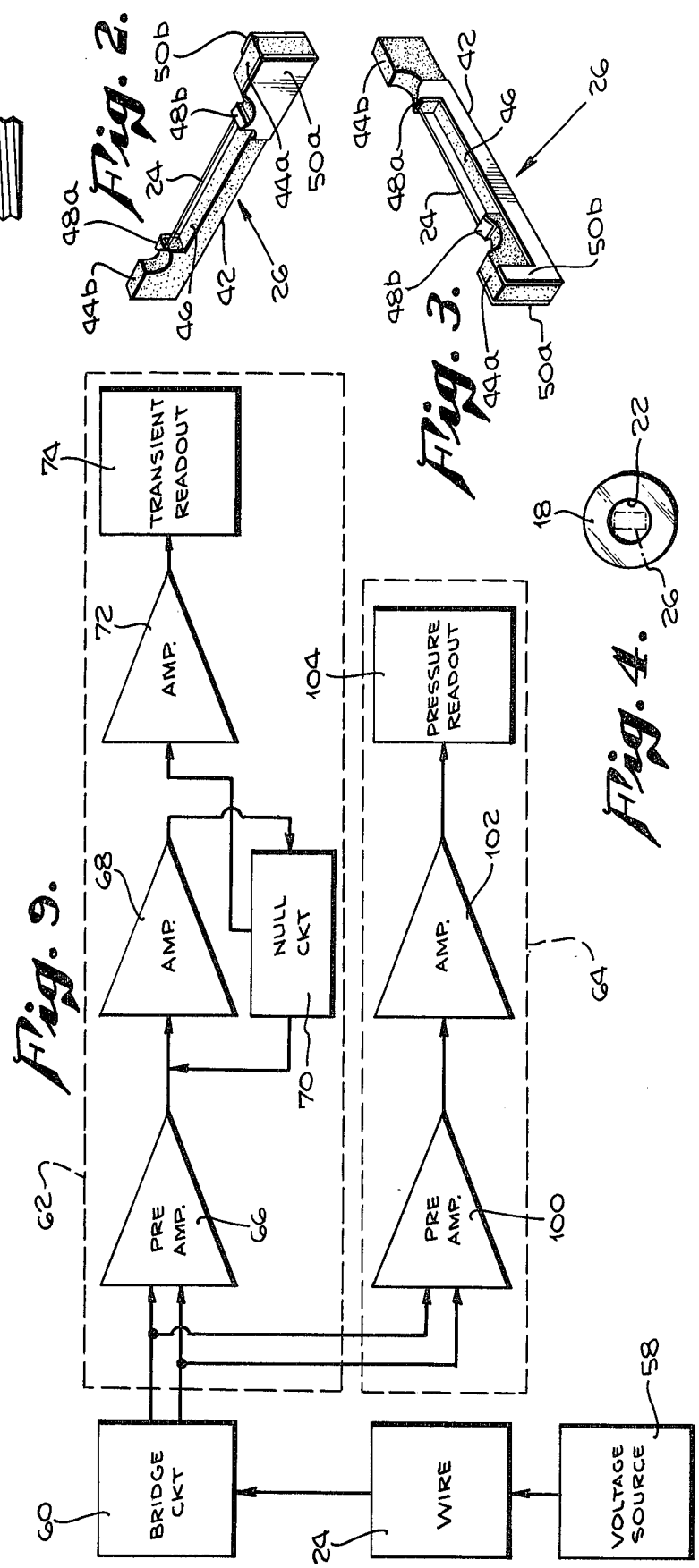

THIN WIRE PRESSURE SENSOR

BACKGROUND

1. Field of the Invention

This invention relates to pressure sensing apparatus, and more particularly to pressure sensing apparatus employing a thin, pressure sensitive resistance wire.

2. Description of the Prior Art

There has been a continuing problem in the achievement of efficient and accurate pressure sensing over a wide pressure range, particularly for applications such as the detection of leaks in a vacuum system, in which a high level of sensitivity may be required. The most sensitive device commonly used for leak detection is a helium-leak detector, which is basically a mass spectrometer in which the readout is confined to the helium line. This is a known technique which is capable of producing highly reliable results in the pressure range below about $10^{-3}$ Torr, and down to about $10^{-11}$ Torr. Leak detection is accomplished according to this method by squirting the outside of suspected areas on the vacuum housing with a small blast of helium from a pressure tank. The helium passes through any leaks in the area and into the vacuum system, where it is detected by the mass spectrometer. A more detailed description of this technique, and also of the acetone-gauge technique described below, is provided in the text "Practical Vacuum Systems" by Roland Rutledge La Pelle, Chapter 17, published by McGraw Hill in 1972.

A major drawback of the mass spectrometer approach is the fact that it is generally inoperative at pressures greater than approximately $10^{-3}$ Torr. Many vacuum systems as originally assembled have so many leaks that they cannot be evacuated to a point permitting employment of the helium-leak detection method. Other undesirable aspects of mass spectrometers are their relative expense, the lengthy initial warm-up which may take up to an hour, and the fact that their electronics tend to saturate under gross leak conditions. After such saturation a lengthy delay in operation, as much as a half hour, may be required before the system can be returned to operation.

Another problem associated with leak detection in the mass spectrometer pressure range arises from the fact that residual gas may be left on the interior walls of the evacuated housing. As the gas slowly escapes from the walls, a "virtual leak" is present but may not be detected with a standard helium leak detector. A solution to this problem involves a fairly complex modification to the mass spectrometer providing a water vapor readout capability coupled with heating of localized areas on the vacuum housing to expel residual gas from the locally heated walls. If a pressure increase is detected, a residual rather than a real leak is indicated.

The acetone-gauge technique mentioned above is useful for leak detection in the approximate pressure range of $10^{-3}$ to $2 \times 10^{-1}$ Torr. This technique involves spraying or painting a small amount of acetone onto a spot on the outside of an evacuated housing where a leak is suspected, and connecting a thermocouple gauge on the pump side of the system so that it reads manifold pressure. If a leak actually exists at the point where the acetone is applied, an immediate pressure rise will occur in the gauge, which then gradually returns to its former reading as the acetone evaporates and is expelled from the system. Once the larger leaks have been located and repaired in this manner, the achievement of a vacuum level low enough to permit use of the helium leak mass spectrometer technique has hopefully been attained.

Other leak detection techniques are known which are useful at pressures greater than $2 \times 10^{-1}$ torr. In the audio amplification approach, which is useful up to approximately one atmosphere pressure, large leaks are detected by passing a sound pickup device over the housing, and listening to detect the sound of gas flowing into a leak. Another known technique which is useful in a more limited pressure range, between about $2 \times 10^{-1}$ and 20 Torr, is the electrical glow discharge technique, which is applicable to glass, but not metal, vacuum housings.

Another limitation of many of the above pressure sensing techniques is that they are dependent upon the establishment of relatively large gas throughputs through the use of relatively large evacuating pumps. It would be desirable to be able to sense pressure with a small pumping system.

Another pressure sensing technique involves the use of pressure sensitive resistance wires, a form of thermistor. In such devices the wire is exposed to the pressure which is to be measured. The resistance of the wire is determined by its temperature, which in turn is dependent upon the temperature and thermal conductivity of the immediately surrounding gas and the ability of the gas to conduct heat away from the wire. Within a relatively small pressure range, up to approximately 1,000 Torr, changes in the gas pressure are accompanied by sometimes significant changes in the thermal conductivity of the gas, resulting from an increased or decreased density of the gas. A transient change in the gas temperature may also accompany pressure changes in accordance with the equation of state. Pressure indications may thus at least theoretically be obtained by using the wire to sense the thermal properties of the gas.

Pressure sensitive wires, however, have generally not been fully suitable for use in highly sensitive applications, such as vacuum leak detectors. Sensitivity is limited by the thickness of the wire, with sensitivity decreasing as the wire gets larger. Therefore, it is highly desirable that very thin wires by employed. For example, a wire thickness down to the order of 0.0001 inch is disclosed in U.S. Pat. No. 3,888,110 to Clark. The use of very thin wires, however, has led to a serious structural problem in that the wires are susceptible to being torn from their mountings under the sudden gas flows and pressure differentials caused by gross leaks. Various designs have been made which at least partially alleviate this problem, such as U.S. Pat. No. 1,768,415 to Matunaga. In this patent the resistance wire is encapsulated within an inner chamber in the vacuum device and isolated from direct contact with the gas of interest. While the wire is thus protected from physical impairment by gas dynamics within the vacuum device, its segregation from those gases may limit its accuracy. Other attempts to solve the problem may be found in U.S. Pat. No. 3,106,088 to Kieselback, in which the wire is surrounded by a perforated gas flow barrier; in U.S. Pat. No. 3,075,379 to Schmauch, in which the wire is disposed transversely to the gas flow between a pair of shielding barriers, and in U.S. Pat. No. 3,720,093 to Gill, in which a thermistor is shielded from direct gas flow by placing it in a cavity and surrounding it with a mesh thimble. In the latter two patents the shielding devices are intended primarily to shield the wire from direct gas flow in order to limit the cooling effect on the wire, and they are not specifically directed to a thin wire leak sensor application. In none of the above devices does the pressure sensitivity approach that of the mass spectrometer.

Accordingly, there is a need for a relatively inexpensive pressure sensing device which is sensitive at low pressures approaching a vacuum level, produces a useful output over a wide pressure range, and avoids the electronic saturation problems of mass spectrometers.

SUMMARY OF THE INVENTION

In view of the above problems associated with the prior art, the primary object of the present invention is the provision of a novel and improved pressure sensing device which is sensitive to pressures over the wide range of pressures encountered in a vacuum system.

Another object is the provision of such a pressure sensing device which utilizes a thin, pressure sensitive resistance wire which is effective over a wide pressure range.

Still another object is the provision of such a pressure sensing device which avoids the problems of electronic saturation encountered with mass spectrometers.

Another important object is the provision of a pressure sensor of the thin wire type having a greatly enhanced sensitivity.

Another object is the provision of a highly sensitive pressure sensor which is relatively inexpensive to manufacture.

Additional objects include the provision of a vacuum system leak detection device which is capable of discriminating between real and virtual leaks at low pressures without modification, and which requires only relatively small throughput pumping systems for proper operation.

These and other objects are achieved in the present invention by the provision of novel mounting apparatus for a thin, pressure sensitive resistance wire which effectively shields the wire from damaging gas flows accompanying changes in the sensed gas pressure. The wire is mounted generally longitudinally within a gas passageway defined by an outer structure. A pair of electrical contacts are provided to apply an electric potential across the wire for measuring its resistance. A baffle means is supported within the passageway near at least one end of the wire to shield the wire from direct impact by gas traversing the passageway in response to changes in the sensed pressure, and thereby reduce the mechanical strength required for the wire connection. The wire diameter is no greater than about 0.00005 inch, which results in a very high level of sensitivity.

In a preferred embodiment, a baffle means is provided integrally with the wire mounting means by means of an elongate, electrically non-conductive member comprising a pair of end shielding portions, an intermediate portion of lesser cross-sectional dimension than the end portion, and a pair of spaced protuberances on the intermediate portion. The resistance wire is mounted between the protuberances in alignment with and shielded by the end portions. Each end of the resistance wire is held to its respective protuberance by a coating of electrically conductive paint, which coatings continue along the sides of the elongate member to provide electric contact surfaces. The end and intermediate portions are formed with a common planar base, from which the end portions extend substantially across the gas passageway to partially occlude the passageway and limit the flow of gas therethrough, in addition to shielding the wire from direct impact by the flowing gas.

The above apparatus is advantageously employed in a pressure sensing system adapted to sense both absolute pressure, and changes in pressure. To sense changes in pressure, the thin wire is incorporated into a circuit which produces an electrical signal the magnitude of which is determined by the sensed pressure level. The signal is processed through an amplifier circuit which produces a nulled output signal when the sensed pressure is at a constant steady state level. An electrical storage circuit is provided to store temporary imbalances caused by a transition from one pressure level to another, and to actuate a readout means or alarm with the stored signal. When the resistance wire output shifts from one steady state level to another, the storage circuit creates an unbalanced output by delaying propagation of the new signal level; when the resistance wire output undergoes primarily a transient change, the storage circuit stores the transient so as to extend an unbalanced condition after the transient is removed from the wire. The above system is particularly suited to use as a vacuum leak detector. The wire assembly may also be used to give direct pressure readings, in which case circuitry is provided to amplify the wire-controlled signal and interface directly with a pressure gauge.

DESCRIPTION OF THE DRAWINGS

Additional features and advantages of the invention will be apparent from the following detailed description of a preferred embodiment, taken together with the accompanying drawings, in which:

FIG. 1 is an exploded plan view of the mechanical components of a pressure sensing system constructed in accordance with the invention;

FIGS. 2 and 3 are perspective views of a mounting structure for the pressure sensitive resistance wire;

FIG. 4 is a cross-sectional view, taken along the plane 4—4 of FIG. 1, showing the wire mounting member in operating position within a gas passageway formed through a surrounding tubular member;

FIG. 9 is a block diagram of a circuit which is responsive to changes in the resistance of the pressure sensitive wire to produce both transient and steady state readouts.

DETAILED DESCRIPTION OF A PREFERRED EMBODIMENT

Figure 5:
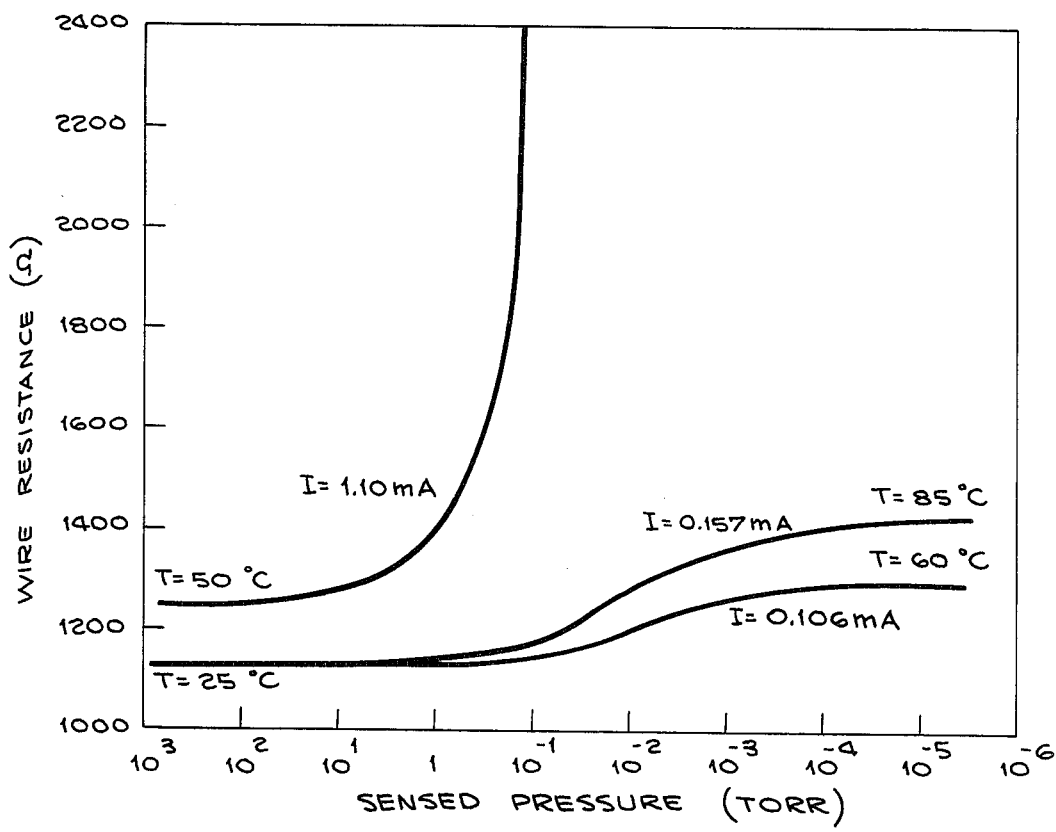
FIG. 5 is a graph of the system's pressure response at various operating currents.

Referring first to FIG. 1, the mechanical components of a broad range pressure sensing system constructed in accordance with the present invention are shown. As used herein, the term "pressure sensing" is intended in its broader sense as including both absolute and/or differential pressure sensing. A tee fitting 2 is provided to couple the sensor with an enclosure having a pressure to be sensed, the tee stem 4 being adapted to receive the sensor apparatus and the tee arms 6a and 6b having outside threads for connection with the enclosure. A generally cylindrical hollow housing 8 fits inside stem 4, with an annular lip 10 at the far open end of the housing sitting over the open end of the stem. An annular collar 12 is provided around the periphery of the housing immediately below lip 10, of a diameter just less than the inside diameter of tee stem 4 such that the housing fits snuggly inside the stem. At the end of the housing facing the tee fitting is a cap 14 of reduced radial dimension, having an orifice 16 centrally located in its end wall. With housing 8 seated in place over stem 4, the inner end of cap 14 extends through fitting 2 approximately to the edge of the gas flow path, permitting gaseous communication through orifice 16 between the enclosure to which the fitting is attached, and the interior elements of the pressure sensor.

A glass tubular member 18 fits longitudinally into housing 8, and is dimensioned such that one end fits securely into cap 14. A fine mesh wire screen 20 is interposed between the inner end of tube 18 and the inner wall of cap 14 to prevent particulate material from entering the pressure sensor. An axial bore 22 is formed through member 18 in alignment with orifice 16, and functions as a gas passageway for coupling the pressure sensing element with the pressure within the enclosure of which tee fitting 2 forms a part.

The actual sensing of pressure is accomplished with a thin, pressure sensitive resistance wire or filament 24, mounted on an elongate substrate member 26. Details of this construction are provided below, but it should be noted at this point that wire support member 26 not only furnishes static support for the wire, but also provides dynamic shielding that protects the wire from structural damage or being torn away from its supports when sensed pressure changes produce a gas flow through tube passageway 22.

The sensing apparatus is protected and sealed from the environment by means of a hermetic cover 28 which sealingly engages a flange 30 on tee fitting stem 4. A connector plug 32 provides an electrical interface between sensor wire 24 and exterior circuitry, and includes a bushing portion 34 which protrudes through an opening in cover 28 and is held in place by a nut on the inside of the cover. A pair of electrical leads in the form of prongs 36a and 36b extend forward from the end of bushing 34 in alignment with the opposite lateral faces of mounting member 26 to engage electrical contact surfaces on that member. Lead prongs 36a and 36b are each provided near their ends with inward directed dimples to strengthen the electrical and mechanical engagement with their respective contact surfaces. An annular flared portion 38 on the plug sits over and seals the cover opening when the unit is assembled. A pair of wires 40 connected respectively to each of leads 36a and 36b is brought out near the outer end of the plug for connection to external circuitry.

Referring now to FIGS. 2 and 3, wire mounting member 26 is seen as an elongate block of uniform width and generally rectangular in cross-section. It is formed from an electrically nonconductive material, preferably a ceramic or glass. Member 26 may generally be viewed as comprising a flat planar base 42, with a pair of enlarged end portions 44a and 44b extending upward from the base, an intermediate and relatively thin portion 46 extending away from the base by a distance less than the end portions, and a pair of peaked protuberances 48a and 48b extending upwardly at each end of the intermediate portion to a level between the top of end portions 44a and 44b and the floor of intermediate portion 46.

Resistance wire 24 is suspended between the peaks of protuberances 48a and 48b parallel to and spaced from the floor of intermediate portion 46, and in alignment between end portions 44a and 44b. The wire diameter is preferably as small as possible, since the sensitivity of the device is strongly dependent upon wire size. As described in greater detail hereinafter, sensitivity is believed to vary approximately inversely with the fourth power of wire diameter in the higher pressure regions, and inversely with the third power of wire diameter in the lower pressure regions. In order to operate over the full pressure of all the prior art devices described above, a wire diameter no greater than approximately 0.00005 inch is required. Ten microinch diameter wire is thought to be the thinnest wire generally available at the present time, but the mounting structure described herein would be capable of supporting and protecting even smaller wires. In one exemplary embodiment a platinum wire 50 microinch in diameter and 0.5 inch long was employed, platinum being preferred because of its strength, chemical inertness, and generally linear thermal coefficient of resistivity. Other types of resistance wires or filaments could also be used, but platinum has been found to possess the best combination of advantageous features.

A theoretical analysis may be made to provide at least a tentative explanation of the very strong dependence of sensitivity upon wire size.

Low Pressure Regime

The overall heat equation which determines the lower limit of pressure sensitivity at pressures less than about 1 Torr may be expressed as $$Q\text{in} = I^2 R = Qg + Qw + Qr. \tag{1}$$

where $I$ = wire current (amperes)
$R$ = wire resistance (ohms)
$Qg$ = heat transfer from gas conduction (watts)
$Qw$ = heat transfer from wire conduction (watts)
$Qr$ = heat transfer from thermal radiation (watts)

$Qg$ dominates the equation for the low pressure range in which pressure measurements are obtainable; below this range $Qw$ and $Qr$ dominate and pressure measurements are no longer obtainable. The lower the pressure, the greater is the impact of $Qw$ and $Qr$ losses and their accompanying limitation on the system's response to changes in pressure. Thus, an estimate of the influence of wire size on system sensitivity can be obtained by estimating the dependence of each of $Qg$, $Qw$, and $Qr$ on wire size. An estimate for $Qg$ will be derived first.

The heat transfer equation for $Qg$ is $$Qg = I^2 R = (2\pi r l) \, kP \, (T\text{-}Tw), \tag{2}$$

where $r$ = wire radius (cm.)
$l$ = wire length (cm.)
$k$ = heat transfer coefficient = $1.66 \times 10^{-2}$ (watts/cm.$^{2\circ}$ KTorr) for air
$P$ = gas pressure (Torr)
$T$ = wire temperature (° K)
$Tw$ = wall temperature (° K)

The solution of equation (2) for the differential resistance response to changes in pressure is given by:

$$\frac{dR}{dP} = \frac{-2\left(\frac{2\pi kl}{l^2}\right) r\, Tw}{\left[1 - \left(\frac{2\pi^2 kl}{\alpha l}\right)\frac{r^3}{l^2} P\right]^2}, \qquad (3)$$

where $\alpha$ = thermal coefficient of resistivity = $3.75 \times 10^{-8}$ (ohm - cm./° K) for platinum, and $R = \alpha lT/\pi r^2$;

or $$\frac{dR}{dP} = \frac{C_1 \frac{r}{l^2}}{\left[1 - C_2 \frac{r^3}{l^2} P\right]^2}, \qquad (4)$$

where $C_1$ and $C_2$ are constants, and $r$ and $l$ are the circuit parameters employed to maximize sensitivity, $dR/dP$.

The $l$ factor may be removed from equation (4) by substituting $$I = V/R = V\pi r^2/\alpha lT, \qquad (5)$$

where $V$ = potential across the wire (volts). Substituting equation (5) into equation (4) and redefining constants, $$\frac{dR}{dP} = \frac{C_3\left(\frac{T^2}{r^3}\right)}{\left[1 - C_4 \frac{T^2 P}{r}\right]^2} \qquad (6)$$

T is a generally insensitive function of P over the entire pressure range of interest (at $10^3$ Torr T = 298° K, and at $10^{-6}$ Torr T = 333° K for I = 0.106ma in the exemplary embodiment described herein). Therefore, a final sensitivity equation may be approximated as $$\frac{dR}{dP} = \frac{\frac{C_5}{r^3}}{\left(1 - C_6\left(\frac{P}{r}\right)\right)^2} \qquad (7)$$

The numerator of equation (7) gives the extreme dependence of sensitivity to wire size, i.e., Sensitivity $\alpha(1/r^3)$. $\qquad (8)$ The denominator of equation (7) indicates that maximum sensitivity occurs for the condition at which $$C_6(P/r) = 1 \qquad (9)$$

Thus, the pressure at which maximum sensitivity is attained is proportional to the wire radius, and the useful low pressure range of the sensor may be extended by reducing the wire radius. At extremely low pressures the denominator of equation (7) approaches unity, resulting in an approximate asymptotic sensitivity value $$dR/dP = C_5/r^3 \qquad (10)$$

Note that, for the very low pressure range under discussion, the change in wire resistance for a change in pressure is independent of the absolute pressure value. For the exemplary embodiment utilizing a 0.00005 inch diameter wire, an asymptotic sensitivity of approximately $3.5 \times 10^5$ ohm/Torr may be calculated. Thus, for resistance measurements in increments of one ohm, a lower measurable pressure limit of 1 ohm/$3.5 \times 10^5$ ohm/Torr = $2.8 \times 10^{-6}$ Torr (approx) can be estimated. However, if the wire size is reduced by a factor of five to 0.00001 inch, the lower limit of the measurable pressure range is extended to $2.3 \times 10^{-8}$ Torr.

As mentioned above, $Qw$ and $Qr$ impose a limit at the low end of the pressure response characteristic. While these losses are ffected by outside factors such as the thermal conductivity of the enclosure surrounding the wire and of the wire support structure, it can be demonstrated that a smaller wire size reduces the pressure at which their effect becomes important. Thus, for $Qw$, $$Qw = (kA/l)\,\Delta T, \qquad (11)$$

where $\Delta T$ is the temperature differential between the middle and ends of the wire (the use of conductive paint to hold the wire at each end of the mounting member is useful in minimizing $\Delta T$). The dependence on wire size can be isolated as $$Qw \,\alpha\, r^2 \qquad (12)$$

For $Qr$, the radiation loss may be calculated from the Stefan-Boltzmann Law $$Qr = \epsilon A\sigma\,(T^4 - Tw^4), \qquad (13)$$

where $\epsilon$ = emissivity (0.4 for platinum)
$\sigma$ = Stefan-Boltzmann constant
$A$ = surface area = $2\pi rl$ The sensitivity of $Qr$ is proportional to $r$, with a direct order reduction in Qr loss with wire size reduction.

Thus, for low pressures the $Qg$ sensitivity increases by approximately a cubic factor as the wire size is reduced, and the $Qw$ and $Qr$ losses which limit the lower limit of pressure sensitivity are reduced respectively by approximately second and first order factors. With the exemplary wire diameter of 0.00005 inch, pressure measurements at less than $10^{-6}$ Torr have been obtained, and the results would be expected to be even better with smaller wires. However, if the wire diameter is increased only to 0.0001 inch, results comparable to those obtained with the helium-leak mass spectrometer method are difficult.

High Pressure Regime

For higher pressures than those discussed above, equation (7) approaches zero and does not apply to the heat transfer situation. In this range, above 1 Torr pressure, the proper equation is $$I^2 R = K2\pi \frac{l(T - Tw)}{ln\left(\frac{x}{r}\right)}, \qquad (14)$$

where $x$ = distance from the wire to the wall, and $k = 2.42 \times 10^{-4}$ Watts/cm². ° K for air.

By substituting the gas temperature $Tg$ for $Tw$ for the case of gas temperature fluctuations caused by momentary compression or expansion of the gas at pressures above 1 Torr, equation (14) may be solved for the transient response $dR/dTg$ to obtain $$\frac{dR}{dTg} = \frac{-4\pi l}{I^2 \ln\left(\frac{x}{r}\right)} \cdot \frac{1}{1 - \frac{2\pi^2 k r^2}{I^2 \alpha \ln\left(\frac{x}{r}\right)}} \quad (15)$$

By combining constants and replacing $I^2$ by $r^4$ (from equation (5)), one obtains $$\frac{dR}{dTg} = \frac{\frac{C_7}{\ln\left(\frac{x}{r}\right) r^4}}{1 - \frac{C_8}{r^6 \ln\left(\frac{x}{r}\right)}} \quad (16)$$

$ln(X/r)$ varies quite slowly with changing $r$, and may be treated as a constant in estimating the sensitivity response. Thus, $$\frac{dR}{dTg} = \frac{\frac{C_9}{r^4}}{1 - \frac{C_{10}}{r^6}} \quad (17)$$

The above equation demonstrates a very strong dependence of sensitivity to wire size, to approximately the fourth power. In addition to making the wire very small, sensitivity could be optimized in the high pressure regime by sizing $x$ and $r$ such that the denominator of equation (17) approaches zero.

In general, different gases or vapors have different heat transfer coefficients. Ingestion of gases (e.g. He) or volatile liquids (e.g. Freon TF or acetone) other than air at the point of leakage in a vacuum system will occur under leak detector operation. This results in a variation in the sensor resistance of Eqs. (2) and (14). The dependence on wire size of sensitivity, to change in gas or vapor thermal conductivity may, be calculated for the low pressure and high pressure regimes in a manner analagous to the derivation of Eqs. (8) and (17). This also results in a calculated wire size dependence of $1/r^3$ and $1/r^4$, respectively.

Returning to the structural features of the invention, each end of wire 24 is mechanically and electrically connected to its respective protuberance 48a or 48b by means of a coating of electrically conductive paint, which may be either gold, silver, or platinum based, and is dried either by heating or by exposure to air. The paint coatings extend from their respective ends of the wire along opposite lateral faces 50a and 50b of mounting member 26 to one end of the member, and provide contact surfaces for leads 36a and 36b of connector plug 32 shown in FIG. 1. The two electrically conductive paint surfaces are spaced apart on the member and electrically segregated, whereby an electric potential transmitted by plug 32 may be applied across the wire by contacting the conductive portions of contact surfaces 50a and 50b with connector prongs 36a and 36b, respectively.

An end view of member 26 positioned within tube 18 is given in FIG. 4. In the exemplary embodiment shown, bore 22 encompasses a cross-sectional area of approximately 15mm², while the end of mounting member 26 occupies an area of approximately 6mm². Member 26 thus occludes a substantial portion of the bore and thereby limits the rate at which gas molecules can flow into or out of the bore, which in turn limits the rate of pressure build up or reduction within the bore. The relative cross-sectional dimensions of tube 18 and mounting member 26 may be varied within considerable ranges, depending upon the anticipated operating conditions and the convenience of the user. In general, a relatively greater occlusion of the bore is desirable for applications in which relatively large and sudden differentials in the sensed pressure may be anticipated, whereas a smaller occlusion is satisfactory when the anticipated pressure differentials are of lesser magnitude. While only that end of mounting member 26 which faces the vacuum enclosure need be enlarged to function as a baffle for protection of the wire in the embodiment shown, member 26 is preferably symmetrical with each end enlarged for convenience and strength in mounting the wire, and to provide two-way protection should the opposite end of the member be exposed to gas flow.

In operation, pressure sensitive wire 24 is shielded by end portions 44a and 44b of the mounting member from direct impact by gases flowing through the tube in response to pressure changes. The wire is mounted midway between the opposite lateral surfaces 50a and 50b of the mounting member, and lies in the "shadow" of one or the other of the end portion during gas movement through the tube. End portions 44a and 44b thus effectively function as baffles for disrupting the gas flow so as to protect the sensing wire, as well as limiting the absolute magnitude of such flow. While this baffle function is most conveniently provided integrally with the wire mounting structure as shown, it would also be possible to provide a baffle separate from the wire mounting member, such as by securing a cap at the end of the tube to shield the wire and partially block the flow of gas through the tube. The invention is thus not limited in its broader sense to any particular configuration of wire mounting member shown in the drawings.

The pressure sensitive structure described thus far may be employed in numerous applications for different pressure conditions. In FIG. 5, the pressure response of a 0.5 inch long, 50 microinch diameter platinum wire is shown for various current levels through the wire over a continuous pressure range from about $10^3$ to about $10^{-6}$Torr. It is seen that the change in wire resistance for changes in pressure increases as the current, and hence the wire temperature, increases. (The wire temperature corresponding to a particular current level depends upon the ambient pressure, since at the lower portions of the pressure range there are insufficient gas molecules to conduct heat away from the wire as rapidly as at the higher pressures.) The sensitivity of the wire in sensing both absolute and differential pressures increases with increasing temperature, since a greater ohmic difference results from a given pressure change at the higher temperatures. Since platinum wire can withstand much greater temperatures than the temperatures given in FIG. 5, a correspondingly greater degree of sensitivity is attainable. In FIG. 5 the resistance scale is incremented in hundreds of ohms for purposes of indicating a greater ohmic range, while in fact ohmic differences in the order of one ohm are measureable. Therefore, even in the higher and lower pressure regions at which the response curves appear to be relatively flat, both absolute and differential pressure measurements can be made.

Figure 6:
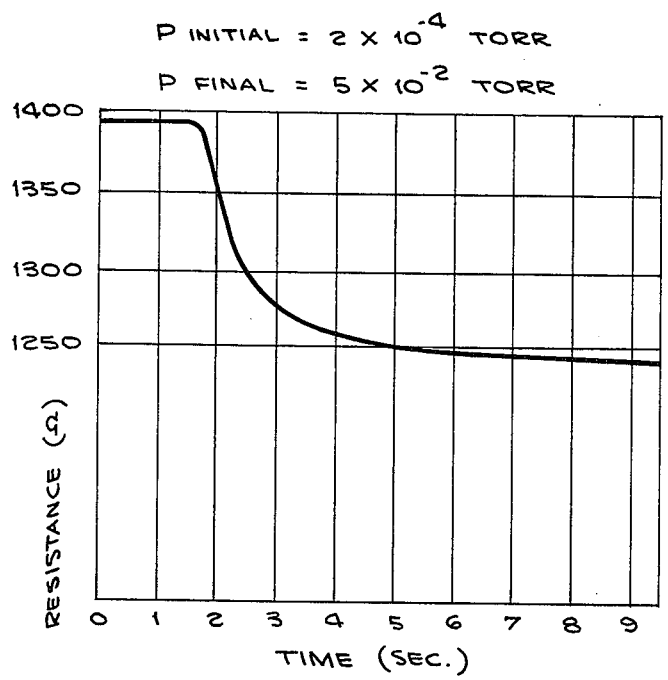
FIGS. 6-8 are graphs of a typical resistance wire response over time to changes in ambient pressure at three different pressure levels.
Figure 7:
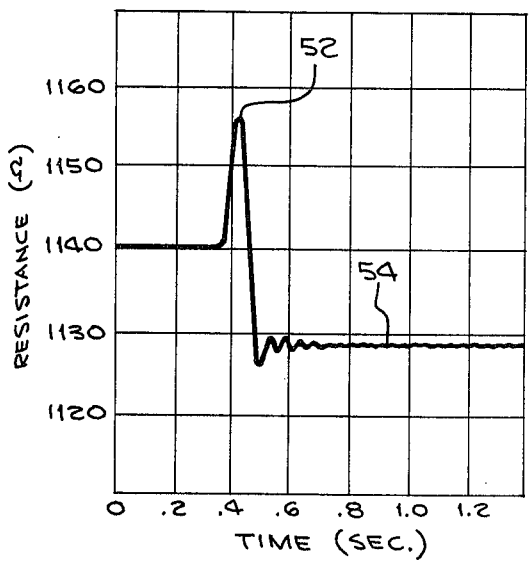
Figure 8:
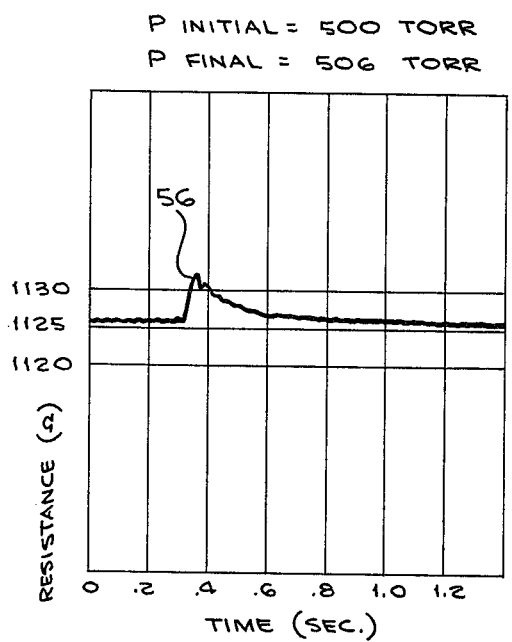

FIGS. 6–8 illustrate the resistance characteristics of the wire 24 which have been found at three different levels within an overall range of $10^{-6}$ to $10^3$ Torr (760 Torr/atmosphere). The data for each of these graphs was obtained with a current of approximately 0.157 amp. through the wire. Depending upon the pressure range over which operation is anticipated, appropriate circuitry may be selected to complete a system which is most sensitive to the anticipated pressures and changes in pressure, and produces a desirable output.

In FIG. 6 the resistance of wire 24 in ohms is plotted against time in seconds for an abrupt pressure jump from $2 \times 10^{-4}$ Torr to $5 \times 10^{-2}$ Torr. It is seen that the resistance of the wire decreases over a period of approximately 6 seconds from about 1,400 ohms to about 1,240 ohms. This may be explained on the basis of a greater concentration of gas molecules at the higher pressure to conduct heat away from the wire more rapidly, and thus decrease its resistance value by the enhanced cooling effect. This transistion is characterized by a relatively large shift in steady state resistance values.

FIG. 7 is a similar graph, with the resistance and time scales somewhat expanded, showing the change in wire resistance accompanying a pressure transition from 1 Torr to 15 Torr. In this case, rather than the steady drop in resistance which accompanied the pressure shift of FIG. 6, an initial upward spike 52 in resistance value is noted, followed by a rapid drop and settling at a final steady state level 54 about 11.7 ohms less than the initial resistance level. This response characteristic may be viewed as the product of two different pressure-temperature effects. As in the example illustrated by FIG. 6, a lower steady state resistance value is reached due to the greater thermal conductivity of the gas at the higher pressure level. Positive-going spike 52, on the other hand, may be accounted for by a temporary increase in the temperature of the gas surrounding the wire when the pressure increases, in accordance with the well known equation of state $PV = mRT$, where $P$ is pressure, $V$ is volume, $m$ is the gas mass, $R$ is a constant, and $T$ is temperature. The gas temperature is returned to its original level by tube 18, which acts as a heat sink.

The wire response to a pressure shift at a higher pressure level, from 500 to 506 Torr, is shown in FIG. 8. The response is primarily a transient one, consisting of an initial positive-going spike 56 that gradually settles to a level close to but somewhat less than the initial resistance value. However, there is still a measureable change in the steady state resistance value, especially when greater currents are employed.

The electric circuitry portion of an exemplary pressure sensing system capable of reacting to each of the resistance response characteristics described above is illustrated in block diagram form in FIG. 9. A voltage source 58, preferably of the bridge rectified, tracking regulator type which is relatively insensitive to variations in the line voltage, produces an output voltage sufficient to drive the desired level of current through the resistance wire 24. That wire is connected as one leg of a Wheatstone bridge circuit 60, the normally balanced output of which is supplied to a transient readout section enclosed in dashed lines and indicated by numeral 62, and also to a pressure readout section also enclosed in dashed lines and indicated by numeral 64.

Transient readout section 62 comprises a differential preamplifier 66 having positive and inverted inputs which receive the normally balanced output of bridge network 60, an amplifier 68 which receives the output of preamplifier 66 and includes a feedback connected null circuit 70, a second amplifier 72 which amplifies a signal from null circuit 70, and a transient readout means 74 such as an analog current meter, which records the output level of amplifier 72 or sounds an alarm in response thereto, as required. The circuit can be used as a leak detector for a vacuum system to sound an alarm should the pressure in the system move away from a vacuum level.

Figure 10:
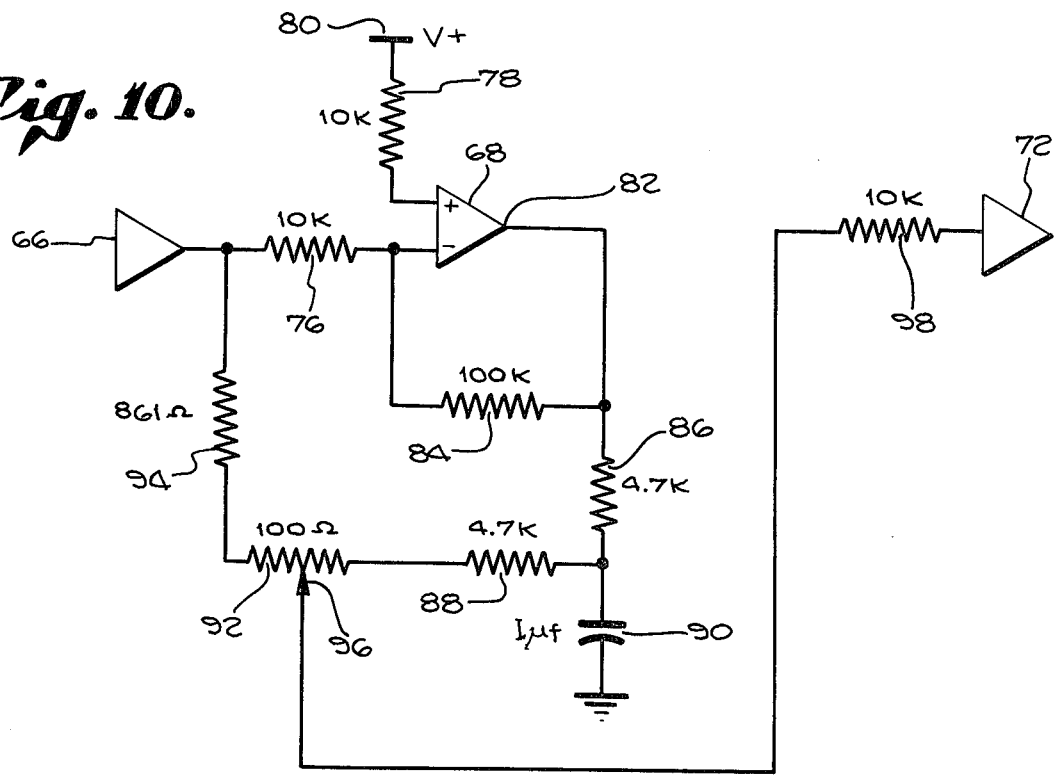
FIG. 10 is a circuit diagram of a portion of the circuitry depicted in FIG. 9, in which a storage circuit is employed to provide both transient and steady state sensing capabilities.

Circuit details of amplifier 68 and its associated null circuit 70 are provided in FIG. 10. The inverted input terminal of amplifier 68 is connected through a resistor 76 to the output of preamplifier 66, while its positive input terminal is connected through another resistor 78 to a positive reference voltage bus 80. The amplifier output terminal 82 is connected through a resistor 84 in a first feedback loop to the inverting input terminal, and also to an RC storage circuit comprising first and second series connected resistors 86 and 88, and a capacitor 90 connected between the resistors to ground. Resistor 88 in turn is connected in series with the resistance element 92 of a potentiometer, and then with a further resistor 94, to the output of the amplifier 66. The adjustable potentiometer tap 96 is connected through a resistor 98 to the inverting input of amplifier 72, whereby a signal appearing on the potentiometer tap is amplified and used to actuate transient readout or alarm device 74.

In operation, transient readout section 62 is capable of responding to both a primarily steady state resistance change as illustrated in FIG. 6, and a primarily transient resistance change as illustrated in FIG. 8. Potentiometer tap 96 is initially set at a null position at which the input and output signal levels of amplifier 68 are balanced, and the signal produced by amplifier 72 in insufficient to actuate transient readout device 74. This condition persists for as long as the wire resistance remains at the same level. Assuming first that the resistance response characteristic to a pressure shift is as shown in FIG. 6, bridge circuit 60 produces an unbalanced output which is amplified by preamplifier 66 and presented to the inverted input of amplifier 68, which in turn produces an amplified output at output node 82. Propagation of the signal to potentiometer element 92, however, is delayed by the RC circuit, such that the right hand terminal of the potentiometer element (as seen in FIG. 10) lags behind the left hand terminal of the element in reaching a new steady state level which corresponds to the new pressure sensed by the wire. During the transient period of this lag, the potentiometer is unbalanced and a signal is transmitted over tap 96 to amplifier 72, which in turn amplifies the signal and actuates transient readout device 74. This response lasts until the transient dies out, as determined by the time constant of the RC circuit.

For pressures at which the wire response is primarily transient, as illustrated in FIG. 8, the RC circuit stores the transient response by either charging or discharging capacitor 90, as determined by the polarity of the transient signal. The output of preamplifier 66 is applied directly to the left hand side of potentiometer element 92, which quickly returns to a steady state level close to its original level when the transient signal dies out. The right hand side of the potentiometer element, however, only gradually returns to its steady state level because of the influence of the RC circuit. A transient imbalance is thus created in the potentiometer which is transmitted as a signal over tap 96 for amplification by amplifier 72 and actuation of transient readout device 74. The imbalance lasts until the voltage level at the right hand side of the potentiometer element reaches the level of amplifier output terminal 82, at which time the potentiometer is again in balance.

Referring back to FIG. 9, steady state readout section 64 is similar to transient section 62, with amplifier 68 and nulling circuit 70 removed. The steady state section comprises a differential preamplifier 100 which is connected to amplify an unbalanced signal produced by bridge circuit 60, an amplifier 102 connected to the output of preamplifier 100, and a steady state pressure readout device 104, such as a digital voltmeter, which is actuated by amplifier 102. It will be recalled that over the approximately 9 decade pressure spectrum described above, each pressure level produces a unique output from bridge circuit 60. Pressure readout device 104 may thus be calibrated to produce an indication of the absolute pressure sensed by the wire, and may be used either in conjunction with transient readout device 74 or by itself.

A gas pressure sensing apparatus has thus been shown and described which is capable of inexpensively and reliably producing a meaningful output over a wide pressure range. Also, the apparatus is inherently adaptable for use in discriminating between real and virtual leaks without modification, and requires a smaller gas throughput than with other systems. While a particular embodiment has been described, numerous variations and modifications thereof will be apparent to those skilled in the art. It is therefore intended that the invention be limited only in terms of the appended claims.

We claim:

1. Apparatus for sensing gas pressure comprising:
   a structure defining a gas passageway,
   a pressure-sensitive, thin resistance wire having a measurable resistance response to pressure changes within a selected pressure regime,
   means mounting said wire in a substantially stationary generally longitudinal position within said passageway,
   a pair of electrical contact means respectively making contact with spaced portions on said wire, for applying to said wire an electrical input signal and inducing therein an output response signal representing the then prevailing resistance value of said wire, and
   baffle means supported within said passageway near an end of the wire for shielding said wire from direct impact by gas traversing said passageway in response to changes in the sensed pressure.

2. The apparatus of claim 1, said baffle means being formed integrally with said wire mounting means.

3. Apparatus for sensing gas pressure, comprising:
   a structure defining a gas passageway,
   a pressure sensitive, thin resistance wire,
   means mounting said wire generally longitudinally within said passageway,
   a pair of electrical contact means respectively making contact with spaced portions on said wire, for applying to said wire an electrical input signal and inducing therein a pressure determined output signal, and
   baffle means supported within said passageway near an end of the wire for shielding said wire from direct impact by gas traversing said passageway in response to changes in the sensed pressure,
   said baffle means being formed integrally with said wire mounting means as a unitary member adapted to be lodged within said gas passageway,
   said member comprising a pair of opposite end portions extending substantially across said gas passageway, an intermediate portion of lesser cross-sectional dimension than said end portions, and means for mounting said resistance wire in alignment with said end portions and in spaced relation to said intermediate portion, said end portions partially occluding said passageway to limit the flow of gas therethrough and shield the wire from direct impact by flowing gas.

4. The apparatus of claim 3, wherein the wire diameter is no greater than about 0.00005 inch.

5. A thin resistance wire assembly, comprising:
   an elongate, electrically nonconductive member comprising a pair of end shielding portions, an intermediate portion of lesser cross-sectional dimension than said end portions, and means for mounting a resistance wire longitudinally between said end portions in alignment therewith and in spaced relation to said intermediate portion,
   a thin resistance wire mounted to said mounting means, and
   electrically conductive material extending across the surface of said elongate member and contacting opposed ends of said resistance wire, said material providing a pair of electrically segregated contact areas for applying an electric potential across said wire.

6. The assembly of claim 5, said wire mounting means comprising a pair of spaced protuberances extending from said intermediate portion in alignment with said end portions, and means for mounting said wire to said protuberances.

7. The assembly of claim 6, the ends of said wire being structurally and electrically connected to said protuberances by an electrically conductive paint.

8. The assembly of claim 6, said elongate member providing a substantially planar base for said end and intermediate portions, said end portions extending away from said base by a greater distance than said intermediate portion, and said protuberances in said intermediate portion extending away from said base a distance less than said end portion.

9. An assembly for sensing the gas pressure in an enclosure, comprising:
   a sealed housing in gas communication with said enclosure,
   a tubular member mounted in said housing for receiving the pressure of said enclosure, said member having a bore extending longitudinally therethrough,
   an elongate, electrically nonconductive member lodged in said bore, said elongate member comprising a pair of end portions of which at least the end portion on the enclosure side of the member extends substantially across said bore to occlude a substantial portion thereof and limit the flow of gas through the bore, an intermediate portion of lesser cross-sectional area than said end portions, and means for mounting a thin resistance wire between said end portions in longitudinally shielded relation thereto, a pressure sensitive, thin resistance wire mounted on said mounting means, a pair of electric contact surfaces on said elongate membr contacting respective opposed ends of said resistance wire, and an electric plug means projecting into said housing for applying an electric potential across said wire, said plug means including a pair of electrically conductive leads adapted to contact respective ones of said electric contact surfaces.

10. The assembly of claim 9, said elongate member having a generally rectangular cross-section.

11. The assembly of claim 10, the end and intermediate portions of said elongate member having a common planar base.

12. A system for sensing pressure changes in a gas, comprising:

housing means adapted to communicate with a gas to be sensed, structure within said housing defining a gas passageway for receiving said gas, means mounting a pressure sensitive, thin resistance wire generally longitudinally within said passageway, electric circuit means connected to said resistance wire for producing an electric signal the magnitude of which is determined by the pressure sensed by said wire, electric storage circuit means responsive to a change in said electric signal for temporarily storing a transient signal indicative of said change, and readout means responsive to a transient signal on said electric storage means for producing a readout indicative of a sensed pressure change.

13. The system of claim 12, said electric storage circuit means comprising an amplifier circuit connected to receive said electric signal as an input, a nulling circuit connected between the input and output of said amplifier, said nulling circuit adapted to produce an actuating signal for said readout means in response to imbalances between the amplifier input and output, and time delay circuit means connected to the amplifier output for delaying the transmission of signal changes at the amplifier output to said nulling circuit means, thereby causing said nulling circuit means to produce an actuating signal for the readout means over at least a portion of the time delay period.

14. The system of claim 12, further comprising baffle means formed integrally with said wire mounting means for shielding said wire from direct impact by gas traversing the passageway in response to changes in the sensed pressure.

15. The pressure sensing system of claim 14, adapted to be used as a leak detector for an evacuated enclosure.

16. A gas pressure sensing system, comprising:

housing means adapted to communicate with a gas to be sensed, structure within said housing defining a gas passageway for receiving said gas, means mounting a pressure sensitive, thin resistance wire in a substantially stationary, generally longitudinal position within said passageway, said resistance wire having a measurable resistance response to pressure changes within a selected pressure regime, baffle means formed integrally with said wire mounting means for shielding said wire from direct impact by gas traversing the passageway in response to changes in the sensed pressure, electric circuit means connected to said resistance wire for producing an electric signal, the magnitude of which is determined by the then prevailing resistance of said wire and thereby represents the pressure sensed by said wire, and readout means responsive to said electric signal for displaying the sensed pressure magnitude.

17. A gas pressure sensing system, comprising:

housing means adapted to communicate with a gas to be sensed, structure within said housing defining a gas passageway for receiving said gas, means mounting a pressure sensitive, thin resistance wire generally longitudinally within said passageway, baffle means formed integrally with said wire mounting means for shielding said wire from direct impact by gas traversing the passageway in response to changes in the sensed pressure, electric circuit means connected to said resistance wire for producing an electric signal, the magnitude of which is determined by the pressure sensed by said wire, readout means responsive to said electric signal for displaying the sensed pressure magnitude, electric storage circuit means responsive to a change in said electric signal for temporarily storing a transient signal indicative of said change, and readout means responsive to a transient signal on said electric storage means for producing a readout indicative of a sensed pressure change.

18. In a system for sensing gas pressure comprising a pressure sensitive resistance wire, means for mounting said wire in gas communication with an enclosure having a gas to be sensed, means for applying an electrical signal to said wire to induce therein a pressure determined output signal, and means for measuring said output signal, wherein the improvement comprises said wire having a diameter no greater than about 0.00005 inch.

19. The system of claim 18, said wire diameter being in the approximate range of 0.00005 inch to 0.00001 inch.

20. The system of claim 18, said wire being formed from platinum.

21. The apparatus of claim 1, said wire having a diameter no greater than about 0.00005 inch.

22. The apparatus of claim 16, said wire having a diameter no greater than about 0.00005 inch.

* * * * *

UNITED STATES PATENT AND TRADEMARK OFFICE
CERTIFICATE OF CORRECTION

PATENT NO. : 4,106,350
DATED : Aug. 15, 1978
INVENTOR(S) : Richard T. Morris, et al.

It is certified that error appears in the above-identified patent and that said Letters Patent are hereby corrected as shown below:

Eq. (3), Col. 7, line 6 and Eq. (15), Col. 9, line 7, change symbols to read the same as the symbol in Col. 7, line 8

Signed and Sealed this

Fifth Day of June 1979

[SEAL]

Attest:

RUTH C. MASON
Attesting Officer

DONALD W. BANNER
Commissioner of Patents and Trademarks